United States Patent Office

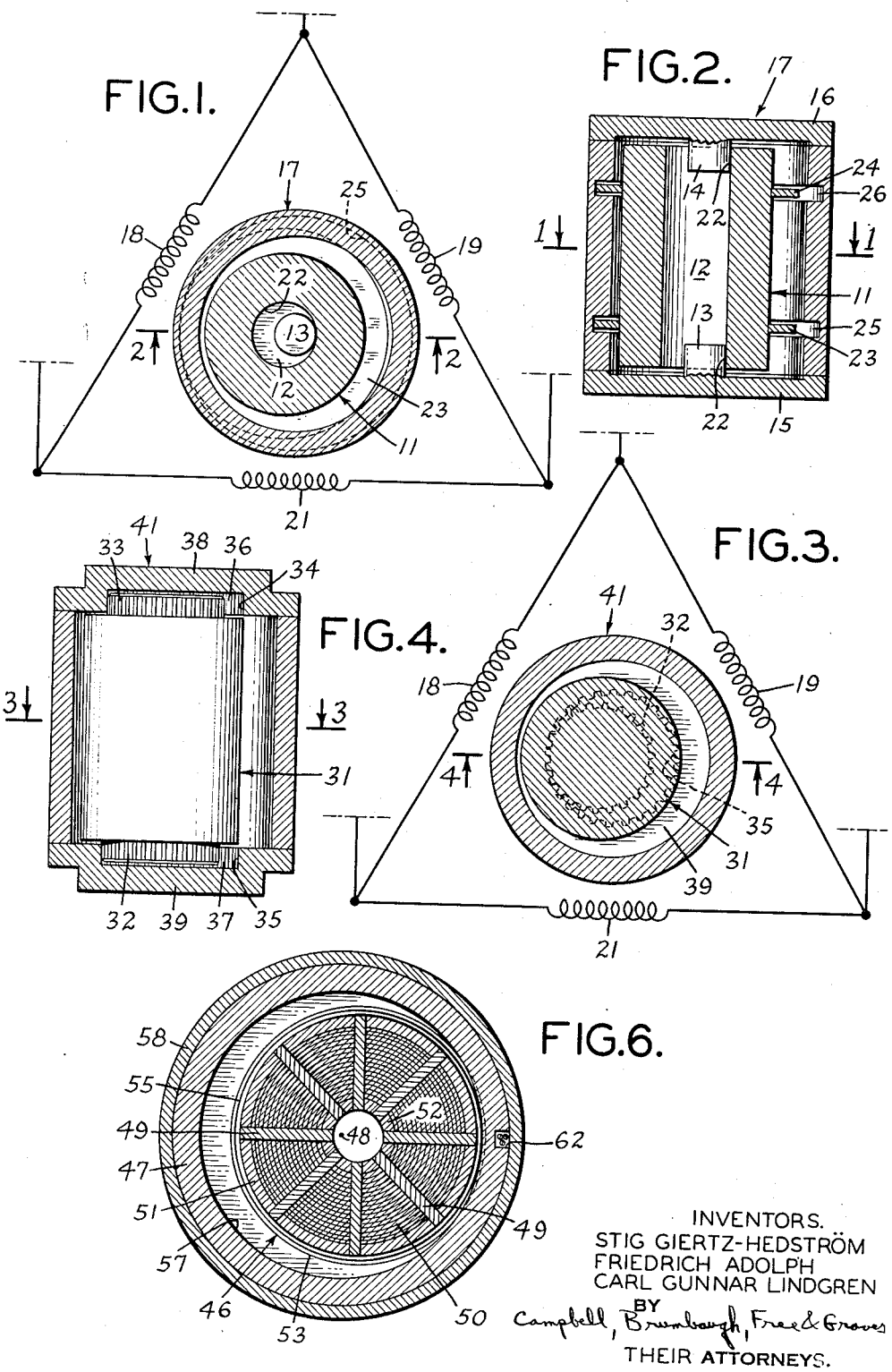

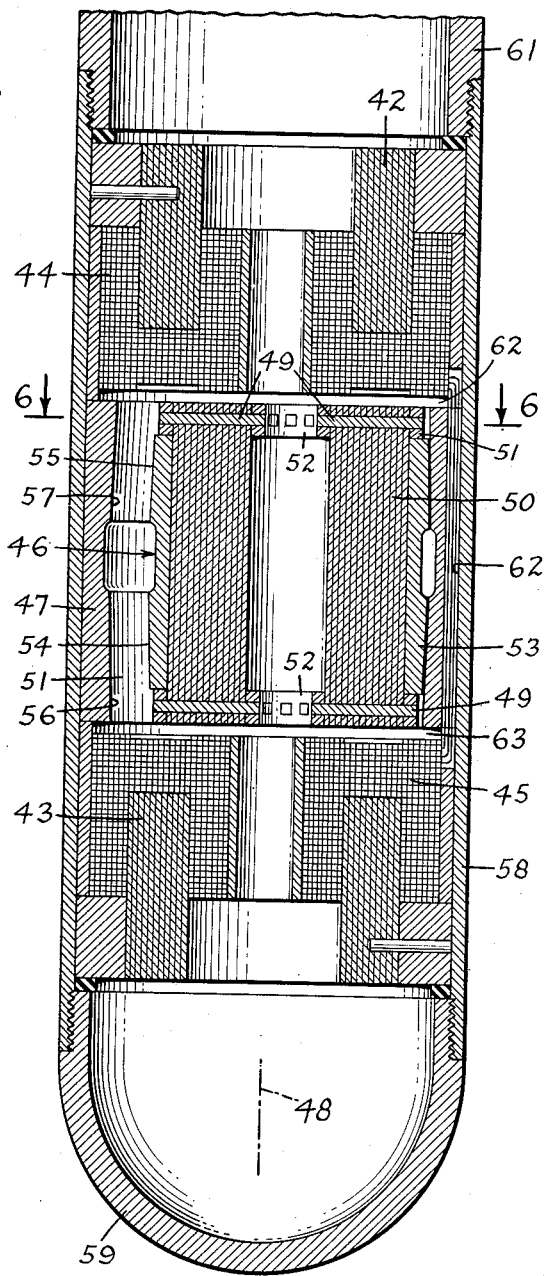

2,761,079
Patented Aug. 28, 1956

2,761,079

ELECTRIC VIBRATOR MECHANISM

Stig Giertz-Hedstrom, Djursholm, and Friedrich Adolph and Carl Gunnar Lindgren, Ljungby, Sweden, assignors to Aktiebolaget Vibro-Betong, Stockholm, Sweden, a company Application November 23, 1951, Serial No. 257,848

Claims priority, application Sweden November 23, 1950

3 Claims. (Cl. 310—82)

The present invention relates to vibrators and, more particularly, to rotary electrical vibrators having eccentric rotatable masses.

It is a common expedient to mount eccentric masses directly on the shaft of an electric motor and thus produce vibrations having a frequency corresponding to the speed of the motor. Vibrators of this type, however, suffer from the disadvantage that the shaft bearings are subject to substantial stresses causing rapid wear, and, if the motor is of the usual squirrel-cage induction type, the frequency of vibration can only be changed by altering the frequency of the rotating magnetic field, an alteration requiring different field windings.

Rotary vibrators have also been constructed with an eccentric mass called a "conical pendulum" which is driven at a fixed end by a motor shaft. The other end of the conical pendulum is adapted to roll around a surface of revolution that is circular in cross section and thus performs a planetary rotary movement. The center of gravity of the conical pendulum rotates at a speed that differs from the speed of the driving motor in accordance with the relative diameters of the free end of the conical pendulum and the associated surface of revolution. Although such rotary vibrators conveniently permit alteration of the frequency of vibration without necessitating changes in the driving motor, this construction requires a relatively large axial dimension and needs a special bearing for the fixed end of the conical pendulum.

It is the object of the present invention to provide a rotary electrical vibrator which has rugged bearings that are relatively unaffected by vibrations and which produces vibrations having a frequency that may be altered without changing the speed of the rotating magnetic field that drives the eccentric mass.

In accordance with the present invention, a vibrator is constructed with a rotor member that is adapted to be spun by a rotating magnetic field. A stator member is provided with a bearing surface substantially coaxial with the axis of rotation of the magnetic field, and the rotor member is constrained to roll about the bearing surface of the stator on a cooperating bearing surface. The rotor member performs a planetary movement with respect to the axis of the rotating magnetic field. The center of gravity of the rotor member spins about the axis of the magnetic field at a frequency that is higher or lower than the frequency of the magnetic field depending upon the relative effective diameters of the bearing surfaces on the rotor and stator members. In some cases, the bearing surfaces are formed with meshing gear teeth in order to prevent slipping between the rotor member and the stator member as the rotor is rotated about its own axis under the action of the rotating magnetic field.

In order that the invention may be more clearly understood, it will now be described in detail with reference to the accompanying drawings wherein:

Figure 1 is a schematic representation in cross section of a rotary vibrator, embodying the principles of the present invention, taken along the line 1—1 of Figure 2 in the direction indicated by the arrows;

Figure 2 is a longitudinal section of the rotary vibrator of Figure 1 taken along the line 2—2 in the direction indicated by the arrows;

Figure 3 is a schematic representation in cross section of a modified form of rotary vibrator, embodying the principles of the present invention, taken along the line 3—3 of Figure 4 in the direction indicated by the arrows;

Figure 4 is a longitudinal section of the rotary vibrator of Figure 3 taken along the line 4—4 in the direction indicated by the arrows;

Figure 5 is a longitudinal section of a more detailed form of rotary immersion vibrator having a construction providing a minimum radial dimension; and Figure 6 is a cross section of the rotary vibrator of Figure 5 taken along the line 6—6 in a direction indicated by the arrows and illustrating the construction of the rotor member.

Referring now to Figures 1 and 2, a rotor 11 is formed as an annular or tubular sleeve with a relatively large central hole 12 into which project stub shafts 13 and 14 attached to end plates 15 and 16 of a stator 17. Stub shafts 13 and 14 are concentric with the axis of rotation of a rotary magnetic field provided by windings 18, 19 and 21 which are energized by a suitable three-phase source of alternating current (not shown). The rotor has an interior cylindrical surface 22 resting on the stub shafts 13 and 14. The rotor 11 acts as a squirrel-cage rotor under the influence of the rotating magnetic field and spins about its own axis at a speed somewhat less than synchronous. The inner surface 22 simultaneously rolls on the stub shafts 13 and 14 with the result that the center of gravity of the rotor 11 rotates around the axis of the magnetic field at a speed greater or smaller than that of the magnetic field in accordance with the diameter of the hole 12 relative to the diameter of the stub shafts 13 and 14.

Any tendency on the part of the rotor to tilt with reference to the axis of the magnetic field is prevented, if necessary, by the provision of annular discs or flanges 23 and 24 attached to the periphery of the rotor 11 and fitting in complementary annular grooves 25 and 26, respectively, in the stator 17. In the embodiment illustrated in Figures 1 and 2, there is sufficient frictional contact between the interior surface 22 of the rotor 11 and the stub shafts 13 and 14 to insure that the rotor rolls on the periphery of the stub shafts without appreciable slippage.

It is to be observed that the stub shafts 13 and 14 can, if desired, form a continuous shaft through the hole 12 in the rotor 11 from the end plate 15 to the end plate 16 without affecting the mode of operation of the vibrator. Likewise, the tilting tendency of the rotor may be overcome by providing annular discs on the inside of the stator 17 projecting into corresponding annular grooves in the rotor 11, an arrangement which is the reverse of that shown in Figure 2. The diameter of the rotor 11 is sufficiently large so that the axis of rotation of the magnetic field passes through and not outside the same and thus causes the rotor to be influenced by substantially all the lines of force in the magnetic field.

In Figures 3 and 4, a form of rotary vibrator is illustrated wherein a rotor 31 is constructed as a solid cylinder provided at each end with stub shafts 32 and 33 concentric with the axis of the rotor 31. The stub shafts 32 and 33 may be formed with gear teeth which mesh with teeth on ring gears 34 and 35 mounted concentric with the axis of rotation of the magnetic field in recesses 36 and 37, respectively, in end plates 38 and 39 of a stator 41. In this construction, there is obviously no slippage between the rotor 31 and the stator 41.

In the forms of the invention illustrated in Figures 1 through 4, the field windings 18, 19 and 21 are arranged radially around the rotor 11 and 31, respectively, and a relatively large air gap is necessarily present over varying portions of the circumference of the stator 17 and 41 respectively. Furthermore, in order to produce large vibration amplitudes, the radial dimensions of the vibrator must be relatively great. In some practical applications, it is desirable to have the least possible radial dimensions. This reduction in size may be achieved by positioning field windings axially in relation to the rotor 11 and 31, respectively, instead of radially. It will be seen with reference to the structure of Figures 5 and 6 that a shorter and constant air gap in the magnetic path can be obtained in conjunction with such reduction in radial dimensions.

The vibrator shown in Figure 5 has a stator comprising substantially similar annular laminated magnetically permeable cores 42 and 43 surrounded by three-phase windings 44 and 45, respectively. The annular cores 42 and 43 are axially disposed with respect to a rotor 46 which lies within a tubular stator sleeve 47 separating the axial portions of the stator. The three-phase windings 44 and 45 cooperate to generate a magnetic field directed axially and at the same time rotating about the axis of symmetry 48 of the stator. In consideration of the direction of the magnetic flux, each of the annular cores 42 and 43 is formed of a strip of magnetically permeable sheet material such as transformer steel wound spirally with the result that all portions of the laminations are axially aligned.

The construction of the rotor 46 is clearly illustrated in Figure 6 wherein the body of the rotor 48 is seen to comprise a spirally laminated annular member 50. The laminations in the member 50 are short-circuited by radial bus bars 49 which connect between outer and inner short-circuiting rings 51 and 52, respectively. The laminated member 50 is surrounded by a tubular sleeve 53 having axially tapered bearing surfaces 54 and 55 which form a slight angle with each other when viewed in cross section. The surfaces 54 and 55 on the periphery of the rotor 46 are adapted to cooperate with complementary tapered bearing surfaces 56 and 57, respectively, which are formed on the inside of the stator sleeve 47. The sleeve 47 loosely surrounds the rotor 46 and is concentric with the axis of rotation of the magnetic field formed between the cores 42 and 43. The internal diameter of the sleeve 47 is greater than the external diameter of the rotor 46 and the bearing surfaces 54, 55 and 56, 57 cooperate to guide the rotor while producing considerable frictional contact. All portions of the rotor and stator are assembled within a cylindrical casing 58 which, in the illustrated form of the invention, is fitted with a hemispherical end 59. The casing 58 may be threaded to a convenient tubular handle 61. The windings 44 and 45 may be electrically interconnected, for example, through a slot 62 in the outside of the stator sleeve 47.

In operation, the rotor 46 reacts with the axially directed rotating magnetic field in a familiar manner analogous to the squirrel-cage rotor of a familiar induction motor. In the present apparatus, it is to be remembered that the axis of the magnetic field is perpendicular to the magnetic axis in the conventional induction motor although, of course, the axis of field rotation is the same, accordingly, the rotor is caused by the rotating magnetic field to turn about its own axis of rotation. The rotor 46 thereupon rolls around the inside surface of the sleeve 47. The center of gravity of the rotor 46 consequently performs a planetary movement which sets up vibrations of a frequency different from the frequency equal to or different from the magnetic field. In this case, the frequency of vibration bears the same ratio to the frequency of the rotation of the magnetic field as the ratio of the outside diameter of the rotor sleeve 53 to the inside diameter of the stator sleeve 47.

It is to be observed that the air gaps indicated at reference numerals 62 and 63 can be designed to be small and are inherently substantially constant. The elimination of all windings surrounding the rotor 46 tends to keep the radial dimension of the vibrator at a minimum. Considered from a somewhat different point of view, larger vibrations can be obtained with the same weight of rotor and with the same radial dimensions as compared to the embodiments of Figures 1 through 4. These advantages are particularly important when the apparatus is to be employed as an immersion vibrator where, as in rod or spade vibrators for concrete, for example, the radial dimensions must be kept small.

The foregoing description will make clear the general principles of the invention. There are, however, various alternative constructions which fall within the scope of the appended claims. For example, the rotating magnetic field may be produced by a two-phase or a split-phase alternating current source. Axially positioned field windings may be employed with the structures of Figure 1 through 4. Also where the rotor provides an inner surface which bears against a shaft that loosely passes through a hole in the rotor, the bearing surfaces may be tapered in a manner similar to that shown in Figure 5 to guide the rotor. The illustrated embodiments are, accordingly, seen to be exemplary only and are not to be construed as limiting the claimed invention.

We claim:

1. A rotary vibrator comprising an induction motor having a rotor and a stator, field windings on said stator for establishing a rotating magnetic field, said field windings disposed axially relative to the rotor to produce magnetic flux having lines of force directed substantially axially through the rotor, said rotor having currents induced therein in response to the rotating magnetic field which results in a tangential torque on the rotor for rotating it about its own axis, substantially cylindrical bearing surfaces on the rotor and stator having appreciably different diameters, and plane end faces formed on the rotor and on the stator, the rotor end faces forming a substantially constant air gap with the axially removed stator faces, whereby the rotor describes a substantially circular planetary motion upon rotation about its own axis.

2. A rotary vibrator as defined in claim 1 wherein the bearing surfaces of the rotor and the stator are provided with meshing teeth to create a frictional contact between the rotor and the stator.

3. A rotary vibrator as defined in claim 1 in which the bearing surfaces are slightly tapered towards both ends of the rotor.

References Cited in the file of this patent

UNITED STATES PATENTS

| | | |
|---|---|---|
| 586,823 | Patten | July 20, 1897 |
| 1,862,356 | Warren | June 7, 1932 |
| 1,925,891 | Apple | Sept. 5, 1933 |
| 2,161,374 | Moineau | June 6, 1939 |
| 2,480,825 | Adolph | Sept. 6, 1949 |
| 2,550,571 | Litman | Apr. 24, 1951 |
| 2,579,865 | Roters | Dec. 25, 1951 |

FOREIGN PATENTS

| | | |
|---|---|---|
| 810,071 | France | Dec. 19, 1936 |